United States Patent
Takazawa et al.

(10) Patent No.: US 11,420,535 B2
(45) Date of Patent: Aug. 23, 2022

(54) BATTERY TEMPERATURE RAISING DEVICE FOR HYBRID VEHICLE

(71) Applicant: Honda Motor Co., Ltd., Tokyo (JP)

(72) Inventors: Masanobu Takazawa, Saitama (JP); Naoaki Takeda, Saitama (JP); Masayuki Toyokawa, Saitama (JP); Hajime Uto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 385 days.

(21) Appl. No.: 16/784,253

(22) Filed: Feb. 7, 2020

(65) Prior Publication Data
US 2020/0269724 A1 Aug. 27, 2020

(30) Foreign Application Priority Data
Feb. 25, 2019 (JP) .............................. JP2019-031872

(51) Int. Cl.
*B60L 58/27* (2019.01)
*B60K 6/28* (2007.10)
(Continued)

(52) U.S. Cl.
CPC ............... *B60L 58/27* (2019.02); *B60K 1/00* (2013.01); *B60K 6/24* (2013.01); *B60K 6/26* (2013.01);
(Continued)

(58) Field of Classification Search
None
See application file for complete search history.

(56) References Cited

U.S. PATENT DOCUMENTS 6,394,210 B2 * 5/2002 Matsuda ............. H01M 10/625
903/903
9,604,627 B2 * 3/2017 Yamanaka ............... B60K 1/04
(Continued)

FOREIGN PATENT DOCUMENTS

CN 203651447 U * 6/2014
CN 105051345 A * 11/2015 ......... B60H 1/00278
(Continued)

OTHER PUBLICATIONS

"Office Action of Japan Counterpart Application" with English translation thereof, dated Dec. 21, 2021, p. 1-p. 8.

*Primary Examiner* — Dirk Wright
(74) *Attorney, Agent, or Firm* — JCIPRNET

(57) ABSTRACT

The disclosure is a battery temperature raising device for hybrid vehicle that raises the temperature of a battery. In an engine travelling mode, when an engine water temperature is higher than a specified cooling water temperature, a first battery circuit is connected to a main circuit and the temperature of the battery is raised by cooling water in the main circuit (first temperature raising control). In a motor travelling mode, when a motor generator temperature is higher than a battery temperature, the first battery circuit and a heat exchanger flow path are connected to the main circuit, and thereby a closed circuit through which cooling water circulates without passing through an engine is formed, and the temperature of the battery is raised by the cooling water that is raised in temperature by heat exchange with a refrigerant in a heat exchanger (second temperature raising control).

3 Claims, 9 Drawing Sheets

(51) Int. Cl.
  *B60K 6/24*     (2007.10)
  *B60K 11/04*    (2006.01)
  *B60K 6/26*     (2007.10)
  *B60K 1/00*     (2006.01)

(52) U.S. Cl.
  CPC ............... *B60K 6/28* (2013.01); *B60K 11/04* (2013.01); *B60K 2001/005* (2013.01); *B60K 2001/006* (2013.01); *B60Y 2200/92* (2013.01); *B60Y 2306/05* (2013.01)

(56) References Cited

U.S. PATENT DOCUMENTS

| | | | | |
|---|---|---|---|---|
| 10,167,769 | B2 * | 1/2019 | Auerbach | F01P 9/06 |
| 10,495,045 | B2 * | 12/2019 | Revach | F02N 19/10 |
| 11,142,036 | B2 * | 10/2021 | Rapp | B60H 1/00914 |
| 2013/0111932 | A1 * | 5/2013 | Mishima | H01M 10/6568 62/159 |
| 2018/0154782 | A1 * | 6/2018 | Lee | B60L 58/26 |

FOREIGN PATENT DOCUMENTS

| | | | | |
|---|---|---|---|---|
| CN | 105501072 | A * | 4/2016 | |
| CN | 108128177 | A * | 6/2018 | ......... B60H 1/00278 |
| DE | 102015101186 | A1 * | 7/2016 | |
| JP | 2005083318 | | 3/2005 | |
| JP | 2010119282 | A * | 5/2010 | ............... B60K 1/04 |
| JP | 2010284045 | | 12/2010 | |
| JP | 2011121551 | | 6/2011 | |
| JP | 2012005245 | | 1/2012 | |
| JP | 2013119259 | | 6/2013 | |
| JP | 2014158393 | | 8/2014 | |
| JP | 2015131597 | A * | 7/2015 | ......... B60H 1/00007 |
| JP | 2017128297 | | 7/2017 | |
| WO | WO-2014147995 | A1 * | 9/2014 | ......... B60H 1/00899 |
| WO | WO-2015139661 | A1 * | 9/2015 | ......... B60H 1/00392 |
| WO | WO-2018121981 | A1 * | 7/2018 | ......... B60H 1/00278 |

* cited by examiner

BATTERY TEMPERATURE RAISING DEVICE FOR HYBRID VEHICLE

CROSS REFERENCE TO RELATED APPLICATIONS

This application claims the priority benefit of Japanese Patent Application No. 2019-031872, filed on Feb. 25, 2019. The entirety of the above-mentioned patent application is hereby incorporated by reference herein and made a part of this specification.

BACKGROUND

Technical Field

The disclosure relates to a battery temperature raising device for hybrid vehicle, which raises the temperature of a battery in a hybrid vehicle having, as a power source, an internal combustion engine and motor generators that mutually convert electric power of the battery and mechanical power.

Related Art

It is known that the battery used for a hybrid vehicle or an electric vehicle such as an electric automobile has a reduced performance in a low temperature state. For example, when a vehicle travels with the battery at a low temperature state, the charge/discharge efficiency of the battery is reduced so that the travelling distance (EV travelling distance) determined by power running or regeneration amount of the motor generator decreases, which causes deterioration of the electric power consumption (fuel consumption). In addition, due to a decrease in the capacity of the battery, the travelling distance also decreases and the maximum output is reduced, which causes an increase in the start frequency of the engine in the case of a hybrid vehicle. Therefore, conventionally, a battery temperature raising device for temperature raising (warm-up) of the battery used in an electric vehicle is known, which is described in patent literature 1 (Japanese Patent Application Laid-Open No. 2012-5245) for example.

In patent literature 1, the electric vehicle includes a chargeable/dischargeable battery, an electric power converter which converts and outputs electric power supplied from the battery, a motor which is driven by the electric power output from the electric power converter, and a control circuit which controls the operation of the electric power converter, and the devices are accommodated in a casing and configured as an integral unit. A refrigerant flow path is formed in the wall portion of the casing, and a refrigerant pipe communicating with the refrigerant flow path and a refrigerant pump and a radiator disposed in the refrigerant pipe are arranged outside the casing.

In this configuration, when the refrigerant pump is operated, the cooling medium (for example, cooling water) flows into the refrigerant flow path of the wall portion of the casing via the refrigerant pipe, flows out after flowing through the refrigerant flow path, and is further sent to the radiator via the refrigerant pipe and cooled by heat dissipation in the radiator. In addition, devices such as the battery, the electric power converter, and the motor described above are arranged in contact with or close to the inner side of the wall portion of the casing, and thereby the battery, the electric power converter, and the motor are cooled in order by the cooling water flowing in the refrigerant flow path in the wall portion. In addition, when the temperature of the battery is raised in a low temperature environment or the like, the cooling water bypasses the radiator and flows into the refrigerant flow path. Thereby, the temperature of the battery is raised by the cooling water heated by heat generation of the electric power converter and the motor.

As described above, in the conventional device, the refrigerant pipe, the refrigerant pump, and the radiator for the cooling or the temperature raising of the motor or the battery are arranged for exclusive use, and the cooling water heated by heat generation of the electric power converter and the motor is used during the temperature raising of the battery. On the other hand, the heat capacity of the battery used in the electric vehicle is usually much larger than the heat capacity of the electric power converter or the motor. Therefore, even if the temperature raising of the battery is performed by the heat generation of the electric power converter and the motor, a sufficient temperature raising effect cannot be obtained, and the above-described problems due to the battery being in a low temperature state cannot be avoided effectively.

SUMMARY

The disclosure provides a battery temperature raising device for a hybrid vehicle, which is capable of sufficiently and efficiently performing temperature raising of a battery during vehicle traveling and thereby improving electric power consumption and extending a travelling distance.

According to one embodiment, the disclosure provides a battery temperature raising device for hybrid vehicle which raises a temperature of a battery in a low temperature state in the hybrid vehicle, the hybrid vehicle having an engine travelling mode using an internal combustion engine as a power source and a motor travelling mode using a motor generator that mutually converts an electric power of the battery and mechanical power as the power source. The battery temperature raising device includes: an engine cooling circuit through which cooling water for cooling the internal combustion engine circulates; a motor generator cooling circuit through which a refrigerant for cooling the motor generators circulates and which is independent of the engine cooling circuit; a first battery circuit which is connected in parallel to the engine cooling circuit and in which cooling water circulates through the battery; a first bypass flow path which bypasses the internal combustion engine, is connected in parallel to the engine cooling circuit, and forms, together with a part of the engine cooling circuit and the first battery circuit, a closed circuit through which cooling water circulates; a heat exchanger which is arranged in the first bypass flow path and performs heat exchange between the cooling water of the engine cooling circuit and the refrigerant of the motor generator cooling circuit; a first switching unit which switches connection/disconnection of the first battery circuit to the engine cooling circuit; a second switching unit which switches connection/disconnection of the first bypass flow path to the engine cooling circuit; a battery temperature sensor which detects the temperature of the battery; an engine cooling water temperature sensor which detects a temperature of cooling water of the internal combustion engine; a motor generator temperature sensor which detects a temperature of the motor generators; and a temperature raising control unit, wherein in the engine travelling mode, the temperature raising control unit performs a first temperature raising control for raising the temperature of the battery by connecting the first battery circuit to the engine cooling circuit with the first switching unit and introducing the cooling water in the engine cooling circuit into the first battery circuit when the detected engine cooling water temperature is higher than a specified cooling water temperature, and in the motor travelling mode, the temperature raising control unit performs a second temperature raising control for raising the temperature of the battery by respectively connecting the first battery circuit and the first bypass flow path to the engine cooling circuit with the first and second switching units and introducing the cooling water raised in temperature by heat exchange with the refrigerant in the heat exchanger into the first battery circuit when the detected motor generator temperature is higher than the detected battery temperature.

DESCRIPTION OF THE EMBODIMENTS

Figure 1:
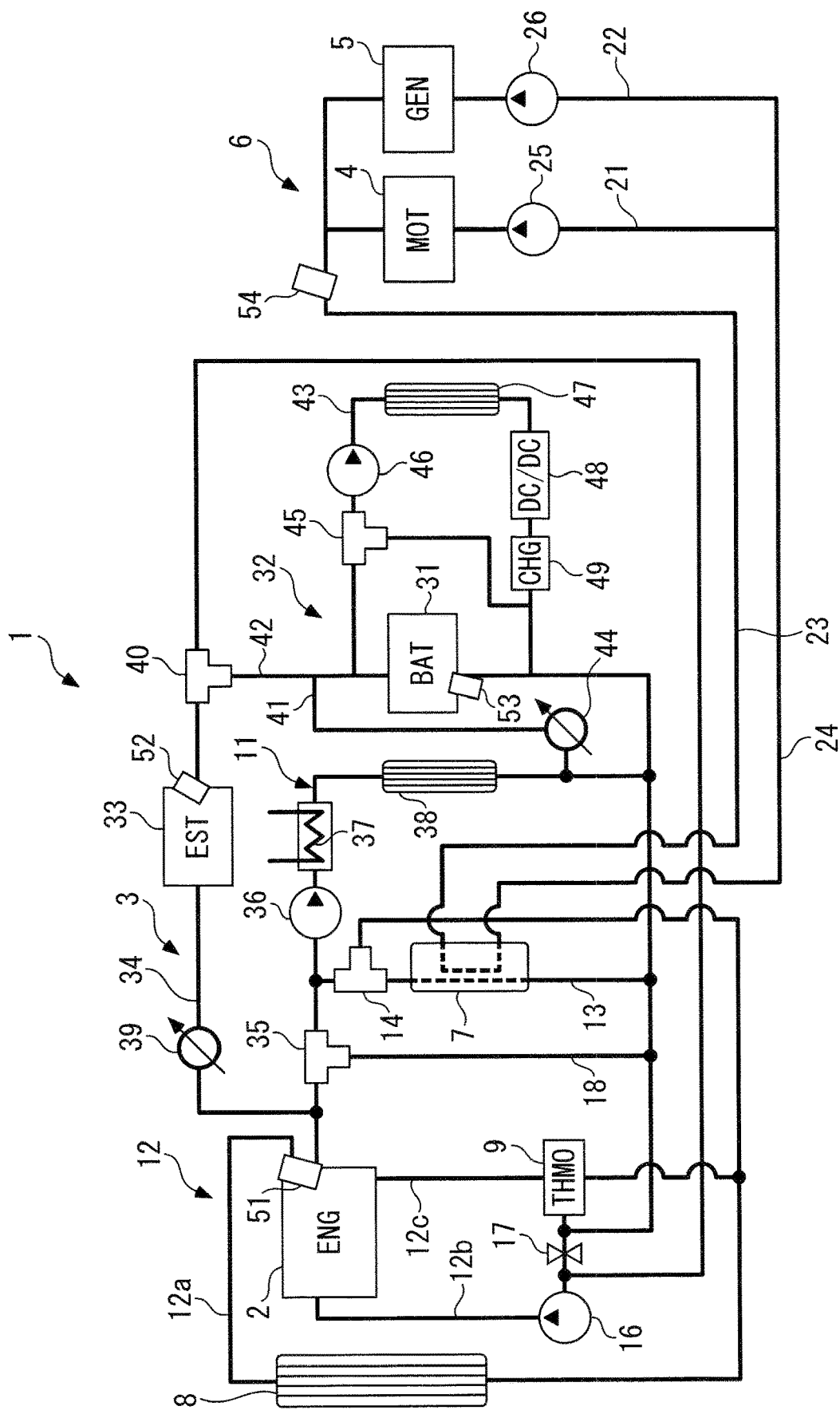
FIG. 1 is a diagram schematically showing a cooling and temperature raising device for hybrid vehicle including a battery temperature raising device according to an embodiment of the disclosure.

Preferable embodiments of the disclosure are specifically described below with reference to the drawings. FIG. 1 schematically shows a cooling and temperature raising device for hybrid vehicle including a battery temperature raising device according to an embodiment of the disclosure.

As shown in the diagram, the hybrid vehicle (hereinafter, referred to as the "vehicle") includes an internal combustion engine 2 and a motor 4 which are power sources, a generator 5 which converts mechanical power of the vehicle into electric power and generates the electric power, a chargeable/dischargeable battery 31 which is a power source of the motor 4, and the like. In this example, a motor generator is configured by the motor 4 and the generator 5 which are separate from each other.

A cooling and temperature raising device 1 performs cooling or temperature raising on the above-described devices or the like of the vehicle according to the status (hereinafter, the "cooling or temperature raising" is appropriately referred to as "the cooling and the like"). The cooling and temperature raising device 1 includes: an engine cooling circuit 3 through which cooling water (for example, LLC (Long Life Coolant)) for the cooling and the like of the internal combustion engine (hereinafter, referred to as the "engine") 2 circulates; a MG (motor generator) cooling circuit 6 through which oil (for example, ATF (Automatic Transmission fluid)) serving as a refrigerant for the cooling and the like of the motor 4 and the generator 5 circulates; a heat exchanger 7 for exchanging heat between the cooling water and the oil; a battery cooling circuit 32 through which cooling water for the cooling and the like of the battery 31 circulates; and the like.

The engine cooling circuit 3 includes: a main circuit 11 through which the cooling water circulates constantly; a radiator circuit 12 which has a radiator 8 and circulates the cooling water between the engine 2 and the radiator 8; a heat exchanger flow path 13 which has a heat exchanger 7 and brings the cooling water flowing out from the engine 2 to the heat exchanger 7 back to the main circuit 11; a first three-way valve 14 which is arranged in the heat exchanger flow path 13 and switches flow paths of the cooling water; a heat accumulator circuit 34 which has a heat accumulator 33 and supplies high-temperature cooling water accumulated in the heat accumulator 33 to the engine 2; and the like.

One end of the main circuit 11 is connected to a cooling water outlet of a water jacket (not shown) of the engine 2, and the other end is connected to a cooling water inlet. In a downstream portion of the main circuit 11, a first water pump 16 that is electric and an on-off valve 17 are arranged in order from a downstream side (a side of the engine 2). The first water pump 16 is configured to have a variable flow rate.

In addition, in the main circuit 11, a second three-way valve 35, a second water pump 36 that is electric, an electric heater 37, a heater core 38 and the like are arranged in order from the upstream side. In addition, a bypass flow path 18 that bypasses the engine 2 is connected in parallel to the main circuit 11. The second three-way valve 35 is configured to be switchable so as to disconnect any one of an upstream portion of the main circuit 11, a downstream portion of the main circuit 11, and the bypass flow path 18 and communicate the other two with each other. Similar to the first water pump 16, the second water pump 36 is configured to have a variable flow rate.

The heater core 38 heats the air for the heating of the vehicle by exchanging heat with the cooling water inside the main circuit 11. The electric heater 37 heats the cooling water when insufficient heating of the air by the heater core 38 occurs because the temperature of the cooling water is low. In addition, in the embodiment, the electric heater 37 is used to raise the temperature of the battery 31.

The radiator circuit 12 has an upstream portion 12a, a downstream portion 12b and the like. One end of the upstream portion 12a is connected to the cooling water outlet of the engine 2, the other end is connected to an upstream side of the on-off valve 17 in the main circuit 11, and the downstream portion 12b is also used as the downstream portion of the main circuit 11.

In the upstream portion 12a, the radiator 8 and a thermostat 9 are arranged in order from the upstream side. The thermostat 9 is connected to the cooling water outlet of the engine 2 via a thermo flow path 12c, and opens the radiator circuit 12 when the temperature of the cooling water is raised and reaches a predetermined temperature (for example, 90° C.). Along with this, the high-temperature cooling water flowing out from the cooling water outlet of the engine 2 sequentially flows through the upstream portion 12a of the radiator circuit 12, the radiator 8, the thermostat 9 and the downstream portion 12b, and returns to the engine 2 via the cooling water inlet. When the high-temperature cooling water flows through the radiator 8, the heat of the cooling water is dissipated from the radiator 8 to the outside.

The heat exchanger flow path 13 bypasses the engine 2 and is connected in parallel to the main circuit 11. Specifically, as for the heat exchanger flow path 13, one end is connected to the immediate upstream side of the second water pump 36 in the main circuit 11 via the first three-way valve 14 and passes through the heat exchanger 7, and the other end is connected between the heater core 38 and the on-off valve 17 in the main circuit 11. The first three-way valve 14 is also connected between the radiator 8 and the thermostat 9 in the radiator circuit 12. In this configuration, the cooling water flowing from the engine 2 into the heat exchanger flow path 13 flows to the heat exchanger 7 side or the radiator circuit 12 side corresponding to the switching state of the first three-way valve 14.

In addition, the heat accumulator circuit 34 is connected in parallel to the main circuit 11, branches from an upstream side of the second three-way valve 35 in the main circuit 11, and joins between the first water pump 16 and the on-off valve 17 in the main circuit 11. In the heat accumulator circuit 34, a first flow rate control valve 39 for adjusting the flow rate of the cooling water, the heat accumulator 33 and a third three-way valve 40 are arranged in order from the upstream side. The heat accumulator 33 has a double structure of inside structure and outside structure, stores, in an adiabatic state, the cooling water of which the temperature is raised during the operation of the engine 2, keeps the temperature, and supplies the cooling water to the engine 2 during the warm-up operation to promote the warm-up. In addition, in the embodiment, the heat accumulator 33 is used to raise the temperature of the battery 31.

In addition, the MG cooling circuit 6 has a motor flow path 21, a generator flow path 22, a feed flow path 23 and a return flow path 24. The motor flow path 21 is passed through the motor 4, has a motor oil pump 25, and is connected to the feed flow path 23 and the return flow path 24 at two ends. The generator flow path 22 is passed through the generator 5, has a generator oil pump 26, and is connected, in parallel with the motor flow path 21, to the feed flow path 23 and the return flow path 24 at two ends. The feed flow path 23 is connected to an oil inlet of the heat exchanger 7, and the return flow path 24 is connected to an oil outlet of the heat exchanger 7.

In the MG cooling circuit 6 with the above configuration, when the motor oil pump 25 is driven, the oil flowing out from the motor 4 flows into the heat exchanger 7 via the motor flow path 21 and the feed flow path 23, and returns to the motor oil pump 25 via the return flow path 24 and the motor flow path 21 after flowing out through the inside of the heat exchanger 7. Similarly, when the generator oil pump 26 is driven, the oil flowing out from the generator 5 flows into the heat exchanger 7 via the generator flow path 22 and the feed flow path 23, and returns to the generator oil pump 26 via the return flow path 24 and the generator flow path 22 after flowing out through the inside of the heat exchanger 7. Besides, when the oil circulates in this way, in the heat exchanger 7, heat exchange is performed between the oil and the cooling water flowing in via the heat exchanger flow path 13.

The battery cooling circuit 32 has a first battery circuit 41, a second battery circuit 42, and a radiator circuit for battery 43. The first battery circuit 41 is connected in parallel to the main circuit 11, branches from the downstream side of the heater core 38 in the main circuit 11, passes through the battery 31, and joins in a downstream side of the branching portion in the main circuit 11. In the first battery circuit 41, a second flow rate control valve 44 for adjusting the flow rate of the cooling water is arranged.

The second battery circuit 42 is connected in parallel to the heat accumulator circuit 34, and is connected to the third three-way valve 40 and passed through the battery 31, and a part at the downstream side of the second battery circuit 42 is also used as a downstream portion of the first battery circuit 41. The third three-way valve 40 is configured to selectively connect an upstream portion of the heat accumulator circuit 34 to a downstream portion of the heat accumulator circuit 34 and the second battery circuit 42.

The radiator circuit 43 is connected in parallel to the first battery circuit 41 in a manner of bypassing the battery 31. In the radiator circuit 43, a fourth three-way valve 45, a third water pump 46 that is electric, a battery radiator 47, a DC/DC converter 48 and a charger 49 are arranged in order from the upstream side. The fourth three-way valve 45 is connected to a downstream side of the charger 49 in the radiator circuit 43.

In the battery cooling circuit 32 configuring as described above, when the second flow rate control valve 44 is opened, according to the opening of the second flow rate control valve 44, the cooling water is introduced from the main circuit 11 to the first battery circuit 41 and circulates through the battery 31. Thereby, according to a temperature relationship between the cooling water and the battery 31, the battery 31 is heated or cooled by the cooling water. In addition, when the third three-way valve 40 is switched to a side of the second battery circuit 42, the high-temperature cooling water inside the heat accumulator 33 is introduced from the heat accumulator circuit 34 to the second battery circuit 42, and thereby the temperature of the battery 31 is raised.

Furthermore, if the fourth three-way valve 45 is switched to a side of the radiator 47, and the third water pump 46 is driven, the cooling water inside the battery cooling circuit 32 is sent out to the radiator circuit 43. Thereby, the heat of the cooling water is dissipated from the radiator 47 to the outside, and the DC/DC converter 48 and the charger 49 are cooled.

Figure 2:
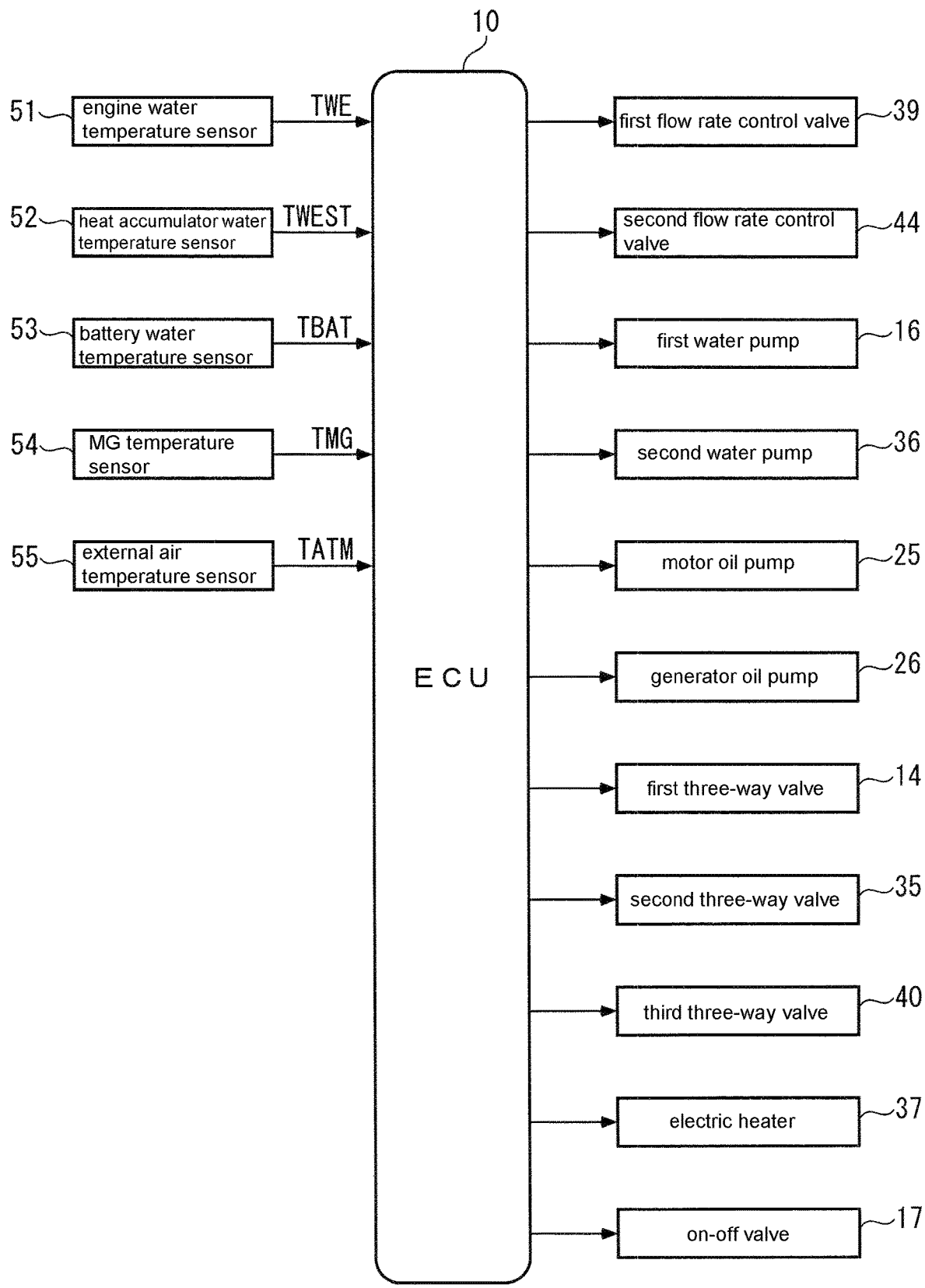
FIG. 2 is a block diagram showing a control device in the cooling and temperature raising device in FIG. 1.

In addition, the cooling and temperature raising device 1 includes the following sensors for detecting the temperature states of various devices, and the detection signals of the sensors are input to the ECU 10 (electronic control unit) (see FIG. 2). Specifically, an engine water temperature sensor 51 which detects the temperature of the cooling water (hereinafter referred to as "engine temperature TWE") near the cooling water outlet of the engine 2 is arranged in the engine 2, and a heat accumulator water temperature sensor 52 which detects the temperature of the cooling water (hereinafter referred to as "heat accumulator water temperature TWEST") near the outlet of the heat accumulator 33 is arranged in the heat accumulator 33.

In addition, a battery temperature sensor 53 which detects the temperature of the cooling water near the outlet of the battery 31 as a battery temperature TBAT is arranged in the battery 31, and a MG temperature sensor 54 which detects the oil temperature as a MG (motor generator) temperature TMG is arranged in the feed flow path 23 of the MG cooling circuit 6. Furthermore, a detection signal representing the temperature of the external air (external air temperature) TATM of the vehicle is input from an external air temperature sensor 55 to the ECU 10.

The ECU 10 is configured by a microcomputer including a CPU, a RAM, a ROM, an I/O interface (none of the parts are shown), and the like. The ECU 10 controls the cooling and temperature raising device 1 by controlling, corresponding to the detection signals and the like of the above various temperature sensors 51-55, the above various devices of the cooling and temperature raising device 1 (the first-third water pumps 16, 36 and 46, the first and second flow rate control valves 39 and 44, the on-off valve 17, the first-fourth three-way valves 14, 35, 40 and 45, the motor oil pump 25, the generator oil pump 26, and the like).

In addition, particularly in the embodiment, the ECU 10 performs, particularly in the embodiment, a battery temperature raising control process for controlling the temperature raising of the battery 31 by controlling the devices shown in FIG. 2 within the above devices.

Figure 3:
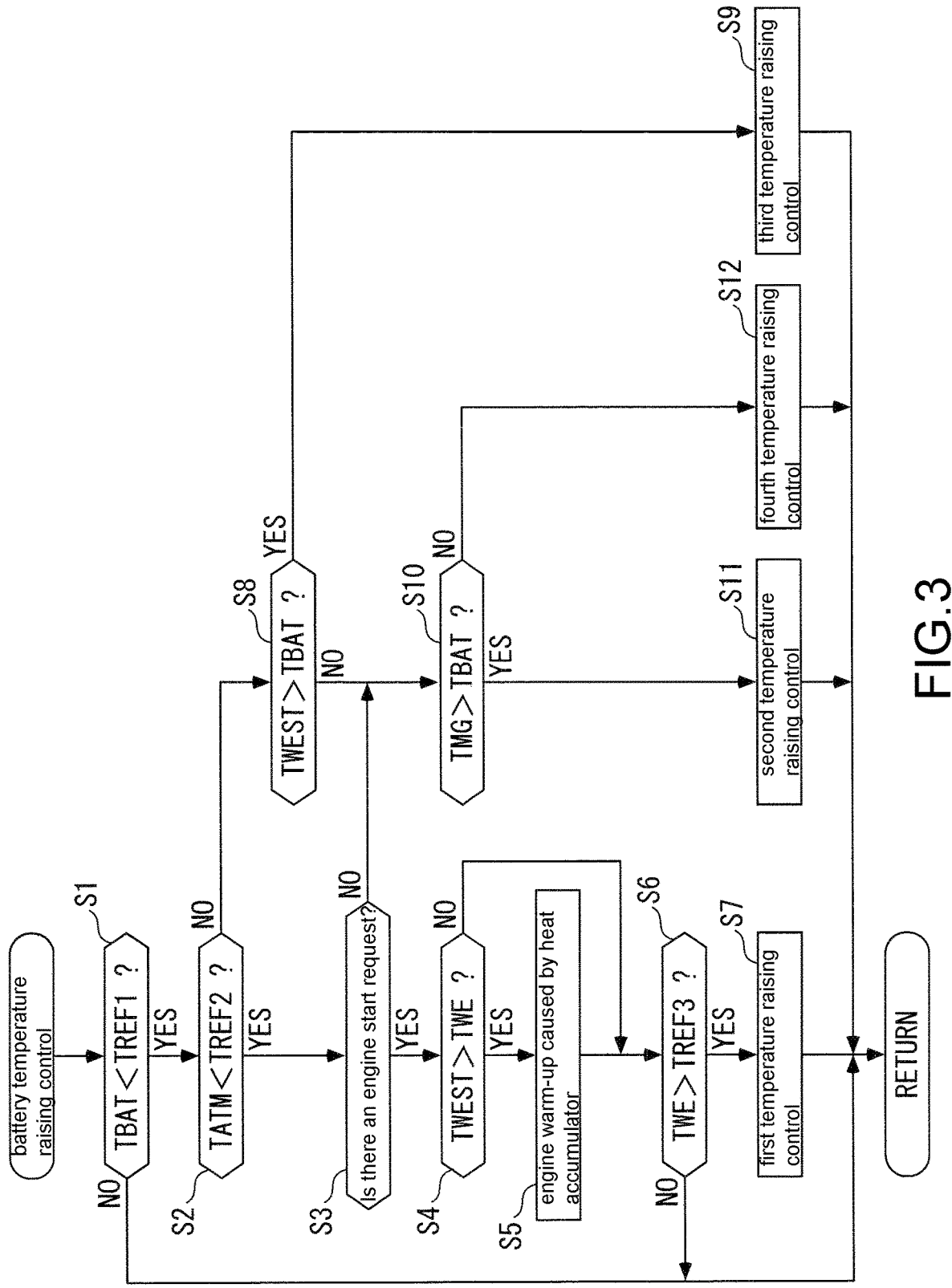
FIG. 3 is a flowchart showing a battery temperature raising control process executed by the control device in FIG. 2.

FIG. 3 shows the battery temperature raising control process. The process is repeatedly performed, for example, at a predetermined cycle. First, in step 1 (illustrated as "S1", the same applies hereinafter) of the process, a determination is made on whether the detected battery temperature TBAT is lower than a first predetermined temperature TREF1. The first predetermined temperature TREF1 is set to a lower limit value of the temperature (for example, −10° C.) of the battery 31 at which the required performance of the battery 31 can be secured. When the answer is NO, the required performance of the battery 31 is secured and the temperature raising of the battery 31 is not necessary, and the process is directly ended.

On the other hand, when the answer to step 1 is YES and the battery temperature TBAT is lower than the first predetermined temperature TREF1, various temperature raising controls for raising the temperature of the battery 31 are performed in the next step 2 and subsequent steps.

First, in step 2, a determination is made on whether the detected external air temperature TATM is lower than a second predetermined temperature TREF2. The second predetermined temperature TREF2 corresponds to a threshold value (for example, −10° C.) that determines which one to select, as the travelling mode of the vehicle, between a travelling mode using the engine 2 as a power source (hereinafter referred to as "ENG travelling mode") or a travelling mode using the motor 4 as a power source (hereinafter referred to as "EV travelling mode"). Specifically, in principle, the ENG travelling mode is selected when the external air temperature TATM is lower than the second predetermined temperature TREF2, and the EV travelling mode is selected when the external air temperature TATM is above the second predetermined temperature TREF2.

When the answer to step 2 is YES, that is, when the ENG travelling mode is selected because the external air temperature TATM is low, a determination is made on whether the engine 2 is required to start (step 3). When the answer is NO, the process proceeds to step 10 described later; when the answer is YES and the engine 2 is required to start, a determination is made on whether the detected heat accumulator water temperature TWEST is higher than the detected engine water temperature TWE (step 4).

When the answer to step 4 is YES and the heat accumulator water temperature TWEST>the engine water temperature TWE, the engine 2 is warmed up by the cooling water in the heat accumulator 33 (step 5). In this warm-up state, for example, the first water pump 16 is operated, the first flow rate control valve 39 is opened, the second three-way valve 14 is switched to disconnect the engine 2 side, and the third three-way valve 40 is switched to disconnect the second battery circuit 42 side.

Figure 4:
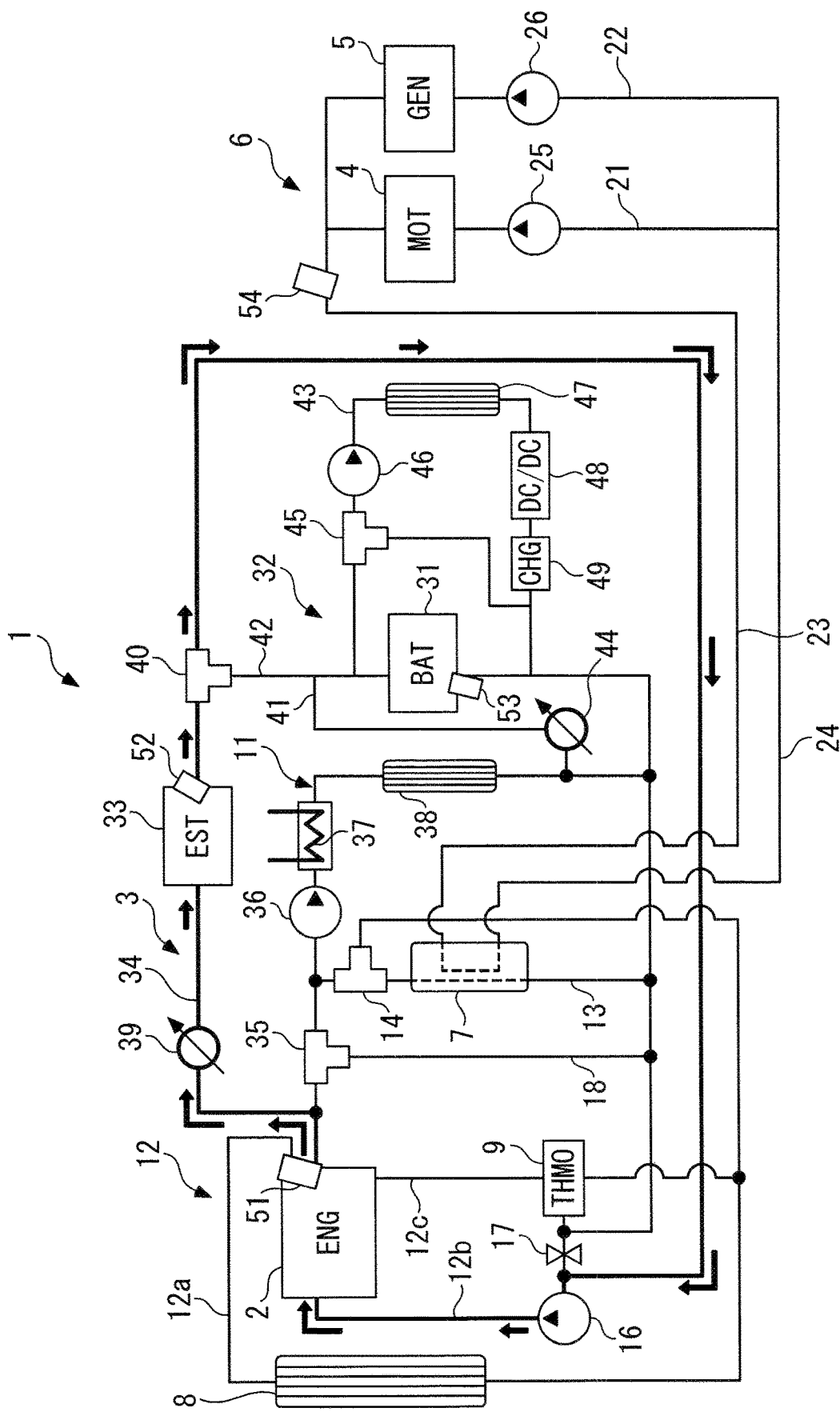
FIG. 4 is a diagram for illustrating flow of cooling water in a cooling and temperature raising device in a warm-up state of an internal combustion engine using cooling water in a heat accumulator.

As shown in FIG. 4, in the engine warm-up state, the cooling water flowing out from the engine 2 flows through the heat accumulator circuit 34 and the heat accumulator 33, and thereby the high-temperature cooling water stored in the heat accumulator 33 is released. Thereby, the high-temperature cooling water in the heat accumulator 33 is supplied to the engine 2 via the heat accumulator circuit 34 and the like and the heat of the cooling water is dissipated to thereby promote the warm-up. Besides, in FIG. 4 and FIGS. 5-9 described later, the flow paths through which the cooling water or oil flows are represented by thick lines, the directions of the flow are indicated by an arrow, and the flow paths through which the cooling water or oil does not flow are represented by thin lines.

Returning to FIG. 3, when the answer to step 4 is NO and the heat accumulator water temperature TWEST is below the engine water temperature TWE, the above step 5 is skipped and the process proceeds to step 6 described later. That is, in this case, since the heat accumulator water temperature TWEST is relatively low with respect to the engine water temperature TWE, the engine warm-up using the cooling water in the heat accumulator 33 is not performed, and the engine 2 is kept in the self-heating state obtained by the heat of its own combustion. In this state, for example, the first water pump 16 is operated, the first flow rate control valve 39 is closed, the second three-way valve 35 is switched to disconnect the bypass flow path 18 side, and the on-off valve 17 is opened.

Figure 5:
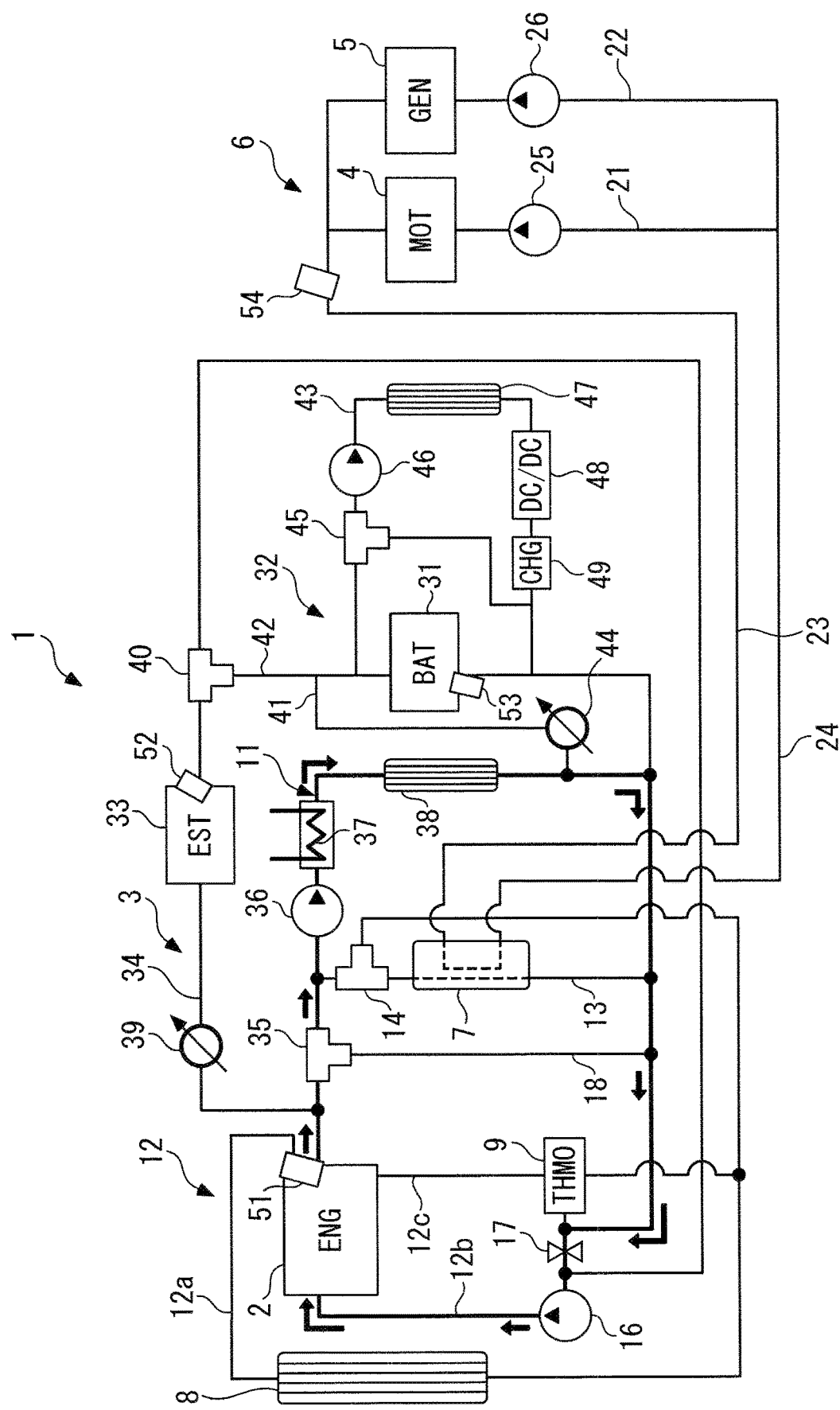
FIG. 5 is a diagram for illustrating the flow of the cooling water in the cooling and temperature raising device in a warm-up state obtained by self-heating of the internal combustion engine.

As shown in FIG. 5, in the self-heating state, the cooling water flowing out from the engine 2 flows through the main circuit 11 via the second three-way valve 35 and returns to the engine 2 via the on-off valve 17 and the like. Accordingly, as the combustion in the engine 2 proceeds, the engine 2 is warmed up by self-heating, and the temperature of the cooling water also rises accordingly.

Returning to FIG. 3, after performing the engine warm-up in step 5 or when the answer in step 4 is NO, a determination is made on whether the engine water temperature TWE is higher than a third predetermined temperature TREF3 (step 6). The third predetermined temperature TREF3 is set to a temperature (for example, 70° C.) at which it is considered that the warm-up of the engine 2 is completed. When the answer to step 6 is NO, the process is ended directly.

On the other hand, when the answer to step 6 is YES and the engine water temperature TWE>the third predetermined temperature TREF3 is satisfied, the warm-up of the engine 2 is completed, and the first temperature raising control is performed in step 7 to raise the temperature of the battery 31 by the cooling water flowing out from the engine 2.

Figure 6:
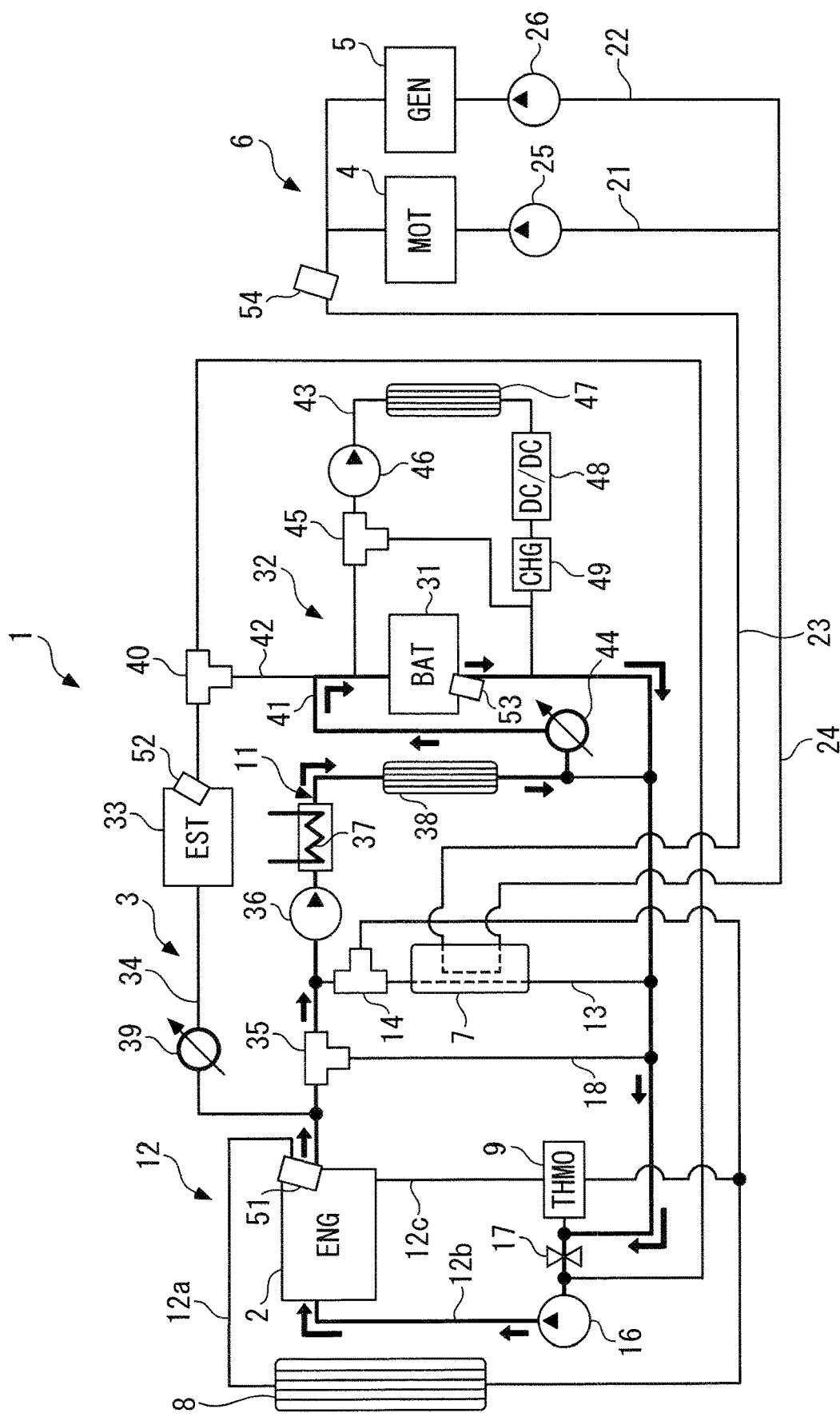
FIG. 6 is a diagram for illustrating the flow of the cooling water in the cooling and temperature raising device in a first temperature raising control utilizing the heat of the cooling water of the internal combustion engine.

In the first temperature raising control, for example, the second flow rate control valve 44 is opened from the above-described self-heating state of the engine 2. Thereby, as shown in FIG. 6, the cooling water flowing out from the engine 2 flows through the main circuit 11, and then is introduced into the first battery circuit 41, flows out through the battery 31, and returns to the engine 2 via the main circuit 11. Accordingly, when the cooling water passes through the battery 31, the temperature of the battery 31 is raised by heat exchange with the cooling water.

As described above, in the first temperature raising control, after the warm-up of the engine 2 is completed, the heat of the cooling water is utilized to raise the temperature of the battery 31. In addition, the cooling water of the engine 2 has a large heat capacity as a whole. Accordingly, by utilizing the heat of the cooling water of the engine 2, the temperature raising of the battery 31 can be performed sufficiently and efficiently without making the electric heater 37 operate, and the electric power consumption can be improved. In addition, since the first temperature raising control is performed on condition that the engine water temperature TWE is higher than the third predetermined temperature TREF3, a situation in which the temperature of the warmed-up cooling water is excessively lowered due to the execution of the first temperature raising control can be avoided.

Returning to FIG. 3, when the answer to step 2 is NO, that is, when the external air temperature TATM is above the second predetermined temperature TREF2 and the EV travelling mode is selected, a determination is made on whether the heat accumulator water temperature TWEST is higher than the battery temperature TBAT (step 8). When the answer is YES and the heat accumulator water temperature TWEST>the battery temperature TBAT is satisfied, the third temperature raising control is performed in step 9 to raise the temperature of the battery 31 by the cooling water in the heat accumulator 33.

In this third temperature raising control, for example, from the state of the first temperature raising control described above, the first flow rate control valve 39 is opened, the second flow rate control valve 44 is closed, the second three-way valve 35 is switched to disconnect the bypass flow path 18, the second three-way valve 35 is switched to disconnect the engine 2 side, and the third three-way valve 40 is switched to disconnect the second battery circuit 42 side.

Figure 7:
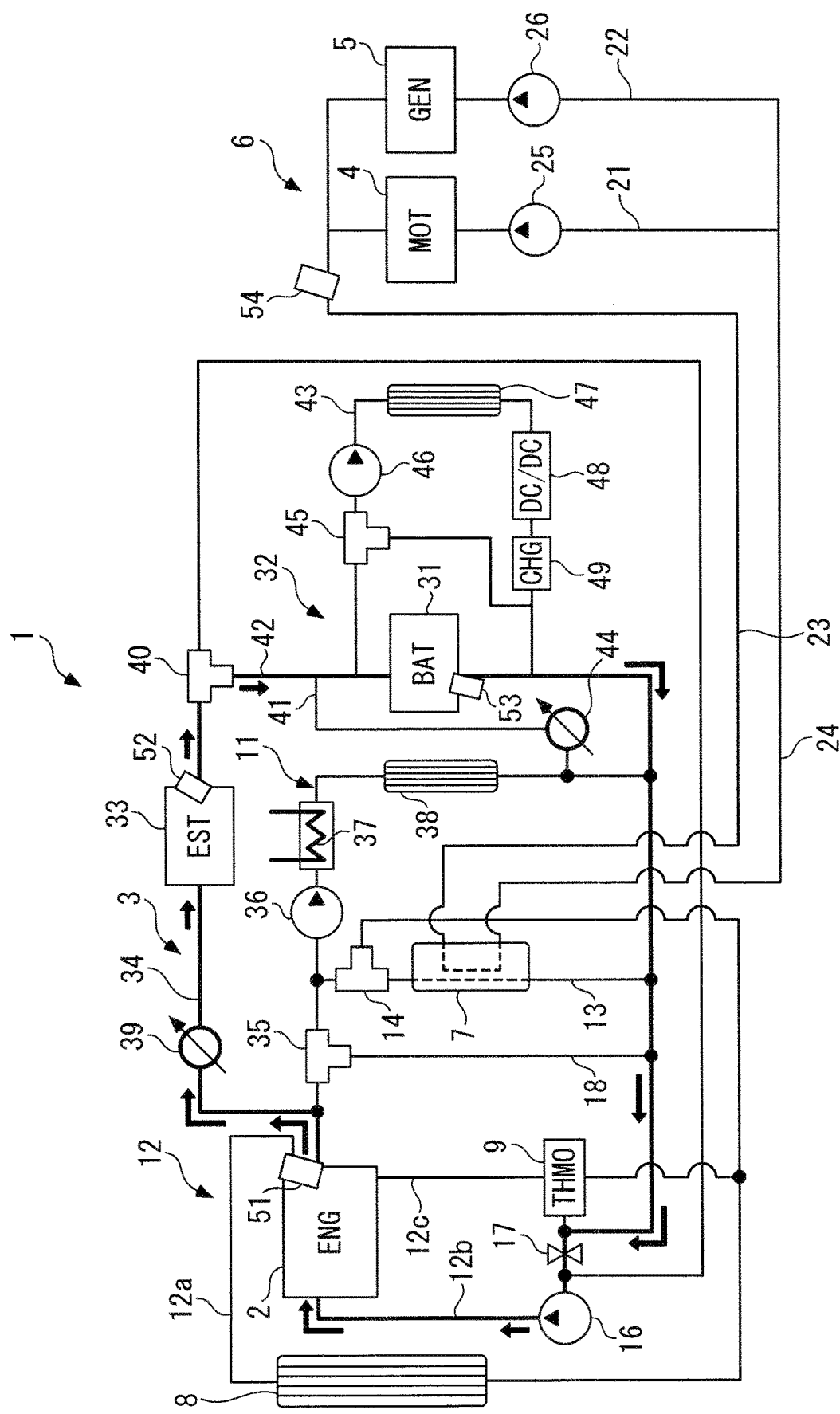
FIG. 7 is a diagram for illustrating the flow of the cooling water in the cooling and temperature raising device in a third temperature raising control utilizing the heat of cooling water in the heat accumulator.

As shown in FIG. 7, according to the third temperature raising control, the cooling water flowing out from the engine 2 flows through the heat accumulator circuit 34 and the heat accumulator 33, and then is introduced into the second battery circuit 42 via the third three-way valve 40, flows out through the battery 31, and returns to the engine 2 via the main circuit 11. Accordingly, when the cooling water passes through the battery 31, the temperature of the battery 31 is raised by heat exchange with the cooling water.

As described above, in the third temperature raising control, the temperature raising of the battery 31 can be effectively performed without making the electric heater 37 operate while utilizing the heat of the cooling water in the heat accumulator 33, and the electric power consumption can be improved.

Returning to FIG. 3, when the answer to step 8 is NO and the heat accumulator water temperature TWEST is below the battery temperature TBAT, or when the answer to step 3 is NO and the engine 2 is not required to start in the ENG travelling mode, a determination is made on whether the detected MG temperature TMG is higher than the battery temperature TBAT (step 10). When the answer is YES and the MG temperature TMG>the battery temperature TBAT is satisfied, the second temperature raising control is performed in step 11 to raise the temperature of the battery 31 by the oil of the MG cooling circuit 6.

In the second temperature raising control, for example, the motor oil pump 25, the generator oil pump 26, and the second water pump 36 are operated, the second flow rate control valve 44 is opened, the first three-way valve 14 is switched to disconnect the heat exchanger flow path 13 side, and the second three-way valve 35 is switched to disconnect the engine 2 side.

Figure 8:
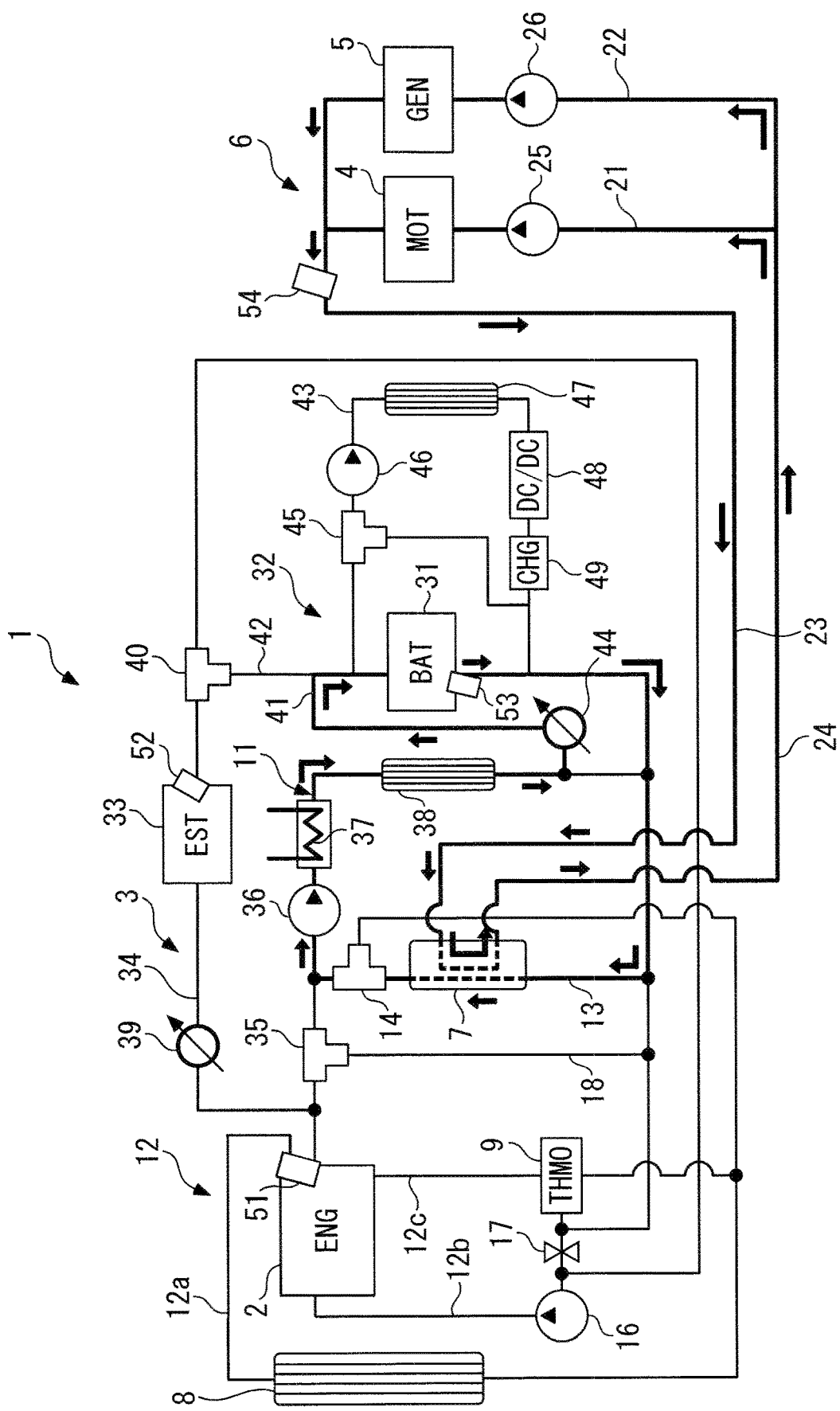
FIG. 8 is a diagram for illustrating the flow of the cooling water in the cooling and temperature raising device in a second temperature raising control using the heat of a refrigerant of a motor generator.

As shown in FIG. 8, according to the second temperature raising control, the motor oil pump 25 and the generator oil pump 26 are operating and thereby the oil of the MG cooling circuit 6 flows from the side of the motor 4 and the generator 5 to the feed flow path 23, flows into the heat exchanger 7, flows out through the inside of the heat exchanger 7, and then returns to the motor 4 and the generator 5 via the return flow path 24.

On the other hand, a closed circuit is formed by the portion of the main circuit 11 from the immediate upstream side of the second water pump 36 to the immediate downstream of the heater core 38, the first battery circuit 41, the portion of the main circuit 11 up to the heat exchanger flow path 13, and the heat exchanger flow path 13. Then, the second water pump 36 is operating, and thereby the cooling water circulates through the closed circuit and is heated by heat exchange with the high-temperature oil when passing through the heat exchanger 7, and raises the temperature of the battery 31 by heat exchange when passing through the battery 31.

In addition, in the second temperature raising control, since the cooling water circulates without passing through the engine 2, temperature reduction of the cooling water due to the influence of the low-temperature engine 2 and heat absorption of the cooling water surrounding the engine 2 is suppressed. Thereby, the temperature raising of the battery 31 can be performed sufficiently and efficiently without making the electric heater 37 operate while utilizing the heat of the oil in the MG cooling circuit 6, and the electric power consumption can be improved.

On the other hand, when the answer to step 10 is NO and the MG temperature TMG is below the battery temperature TBAT, that is, when the second temperature raising control is not performed because the above execution condition is not satisfied, or when the battery temperature TBAT does not reach the first predetermined temperature TREF1 and the battery temperature raising has not yet been achieved even if the second temperature raising control is performed, the fourth temperature raising control is performed to raise the temperature of the battery 31 by heating using the electric heater 37.

In the fourth temperature raising control, for example, the electric heater 37 is operated, the second water pump 36 is driven, the second flow rate control valve 44 is opened, and the first three-way valve 14 is switched to disconnect the main circuit 11 side, and the second three-way valve 35 is switched to disconnect the engine 2 side.

Figure 9:
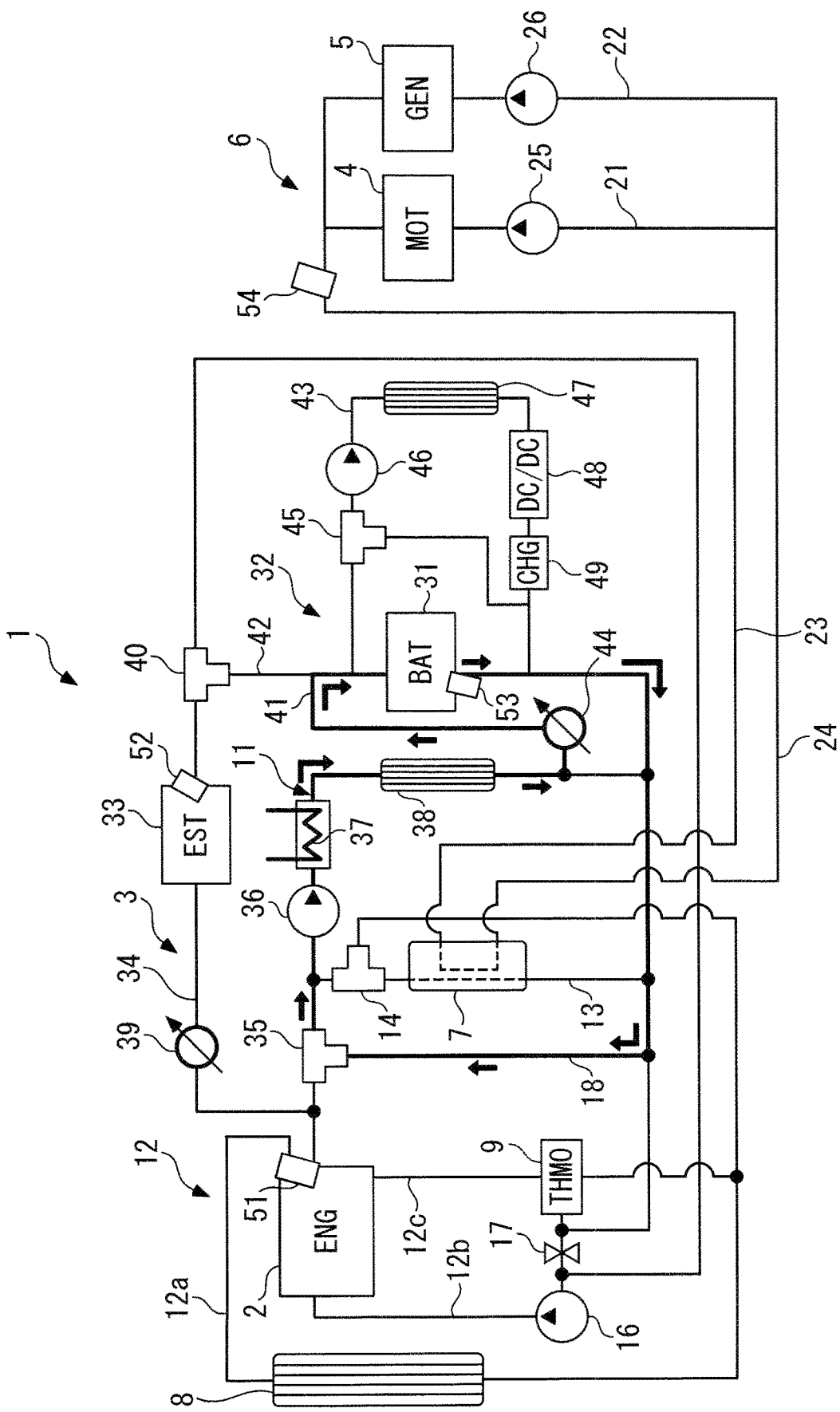
FIG. 9 is a diagram for illustrating the flow of the cooling water in the cooling and temperature raising device in a fourth temperature raising control utilizing heating performed an electric motor.

As shown in FIG. 9, according to the fourth temperature raising control, the cooling water in the main circuit 11 flows through the main circuit 11 due to the second water pump 36 in a state of being heated by the electric heater 37, and then is introduced into the first battery circuit 41, flows out through the battery 31, and returns to the engine 2 via the main circuit 11. When the cooling water passes through the battery 31, the temperature of the battery 31 is raised by heat exchange with the cooling water.

As described above, in the fourth temperature raising control, the battery temperature raising can be reliably achieved by introducing the cooling water in the main circuit 11 heated by the electric heater 37 into the first battery circuit 41. In addition, a closed circuit is formed by a part of the main circuit 11, the first battery circuit 42 and the bypass flow path 13, and the cooling water circulates through the closed circuit and does not flow to the internal combustion engine. Thereby, temperature reduction of the cooling water due to the influence of the low-temperature engine 2 and heat absorption of the cooling water surrounding the engine 2 is suppressed, and the temperature raising of the battery using the electric heater 37 can be performed efficiently.

Besides, the disclosure is not limited to the described embodiments and can be implemented in various aspects.

For example, in the embodiments, a flow rate control valve (the second flow rate control valve 44) is used as the first switching unit which switches connection/disconnection between the main circuit 11 and the first battery circuit 41, and a three-way valve (the first three-way valve 14) is used as the second switching unit which switches connection/disconnection between the main circuit 11 and the heat exchanger flow path 13, but any type of switching unit can be adopted as long as connection/disconnection between the two circuits is possible. The same applies to the third three-way valve 40 constituting the third switching unit and the second three-way valve 35 constituting the fourth switching unit.

In addition, in the embodiments, as a temperature representative of the cooling water temperature of the engine 2 (the engine water temperature TWE), the cooling water temperature of the heat accumulator 33 (the heat accumulator water temperature TWEST), or the temperature of the battery 31 (the battery temperature TBAT), the cooling water temperature near the outlet of each device is detected, but the disclosure is not limited hereto, and the cooling water temperature inside each device or near the inlet may also be detected.

In addition, the configuration of the cooling and temperature raising device 1 shown in FIG. 1 and the like is merely an illustration, and the detailed configuration can be changed within the scope of the gist of the disclosure.

Other Configurations

According to one embodiment, the disclosure provides a battery temperature raising device for hybrid vehicle which raises a temperature of a battery in a low temperature state in the hybrid vehicle, the hybrid vehicle having an engine travelling mode using an internal combustion engine as a power source and a motor travelling mode using a motor generator 4 and 5 that mutually converts an electric power of the battery 31 and mechanical power as the power source. The battery temperature raising device includes: an engine cooling circuit (a main circuit 11 in an embodiment (hereinafter the same applies)) through which cooling water for cooling the internal combustion engine 2 circulates; a motor generator cooling circuit 6 through which a refrigerant for cooling the motor generators 4 and 5 circulates and which is independent of the engine cooling circuit; a first battery circuit 41 which is connected in parallel to the engine cooling circuit and in which cooling water circulates through the battery; a first bypass flow path (a heat accumulator flow path 13) which bypasses the internal combustion engine 2, is connected in parallel to the engine cooling circuit, and forms, together with a part of the engine cooling circuit and the first battery circuit 41, a closed circuit through which cooling water circulates; a heat exchanger 7 which is arranged in the first bypass flow path and performs heat exchange between the cooling water of the engine cooling circuit and the refrigerant of the motor generator cooling circuit 6; a first switching unit (a second flow rate control valve 44) which switches connection/disconnection of the first battery circuit 41 to the engine cooling circuit; a second switching unit (a first three-way valve 14) which switches connection/disconnection of the first bypass flow path to the engine cooling circuit; a battery temperature sensor 53 which detects the temperature TBAT of the battery 31; an engine cooling water temperature sensor (an engine water temperature sensor 51) which detects a temperature of cooling water of the internal combustion engine 2 (an engine water temperature TWE); a motor generator temperature sensor (a MG temperature sensor 54) which detects a temperature TMG of the motor generators 4 and 5; and a temperature raising control unit (an ECU 10), wherein in the engine travelling mode, the temperature raising control unit performs a first temperature raising control for raising the temperature of the battery 31 by connecting the first battery circuit 41 to the engine cooling circuit with the first switching unit and introducing the cooling water in the engine cooling circuit into the first battery circuit 41 when the detected engine cooling water temperature is higher than a specified cooling water temperature (a third specified temperature TREF3) (steps 2, 6 and 7 in FIG. 3), and in the motor travelling mode, the temperature raising control unit performs a second temperature raising control for raising the temperature of the battery 31 by respectively connecting the first battery circuit 41 and the first bypass flow path to the engine cooling circuit with the first and second switching units and introducing the cooling water raised in temperature by heat exchange with the refrigerant in the heat exchanger 7 into the first battery circuit 41 when the detected motor generator temperature TMG is higher than the detected battery temperature TBAT (steps 2, 10 and 11 in FIG. 3).

The hybrid vehicle to which the disclosure is applied has the engine travelling mode using the internal combustion engine as a power source and the motor travelling mode using the motor generators as a power source. In addition, the battery temperature raising device of the disclosure includes the engine cooling circuit through which the cooling water circulates, the motor generator cooling circuit in which the refrigerant circulates, the first battery circuit in which the battery is arranged and through which the cooling water circulates, the first bypass flow path which bypasses the internal combustion engine and forms, together with a part of the engine cooling circuit and the first battery circuit, a closed circuit through which the cooling water circulates, and the heat exchanger which is arranged in the first bypass flow path and performs heat exchange between the cooling water and the refrigerant; and these devices are configured as described above.

According to the battery temperature raising device, in the engine travelling mode, the first temperature raising control is performed when the detected engine cooling water temperature is higher than a predetermined cooling water temperature. In the first temperature raising control, the temperature of the battery is raised by connecting the first battery circuit to the engine cooling circuit and introducing the cooling water in the engine cooling circuit into the first battery circuit. Accordingly, in the engine travelling mode, for example, the heat of the high-temperature cooling water of the internal combustion engine after the completion of warm-up is utilized to raise the temperature of the battery. In addition, the cooling water of the internal combustion engine has a large heat capacity as a whole. Accordingly, the temperature raising of the battery can be performed sufficiently and efficiently by utilizing the heat of the cooling water of the internal combustion engine. Furthermore, since the first temperature raising control is performed on condition that the engine cooling water temperature is higher than the predetermined cooling water temperature, a situation in which the temperature of the warmed-up cooling water is excessively lowered due to the execution of the first temperature raising control can be avoided.

On the other hand, in the motor travelling mode, the second temperature raising control is performed when the detected motor generator temperature is higher than the battery temperature. In the second temperature raising control, the temperature of the battery is raised by respectively connecting the first battery circuit and the first bypass flow path to the engine cooling circuit and introducing the cooling water raised in temperature by heat exchange with the refrigerant in the heat exchanger into the first battery circuit. Accordingly, in the motor travelling mode, the heat of the refrigerant of the motor generator is utilized to raise the temperature of the battery.

In addition, in the motor travelling mode, the internal combustion engine is not operated, and thus the cooling water may be in a low temperature state and acts to prevent the temperature raising of the battery in this case. On the contrary, in the second temperature raising control, a closed circuit is formed by a part of the engine cooling circuit, the first battery circuit, and the first bypass flow path that bypasses the internal combustion engine, and thus the cooling water circulates through the closed circuit and does not flow to the internal combustion engine. Thereby, in the motor travelling mode, temperature reduction of the cooling water due to the influence of the low-temperature internal combustion engine and heat absorption of the cooling water surrounding the internal combustion engine is suppressed, and thus the temperature raising of the battery can be performed sufficiently and efficiently while utilizing the heat of the refrigerant of the motor generator. As described above, the electric power consumption can be improved and the travelling distance can be extended.

In one embodiment of the disclosure, the battery temperature raising device for hybrid vehicle further includes a heat accumulator circuit 34 which is connected in parallel to the engine cooling circuit and through which the cooling water flowing out from the internal combustion engine 2 circulates; a heat accumulator 33 which is arranged in the heat accumulator circuit 34, stores the cooling water, and accumulates heat of the cooling water; a second battery circuit 42 which is connected in parallel at a the downstream side of the heat accumulator 33 in the heat accumulator circuit 34 and in which the cooling water circulates through the battery 31; a third switching unit (a third three-way valve 40) which switches connection/disconnection of the second battery circuit 42 to the heat accumulator circuit 34; and a heat accumulator cooling water temperature sensor (a heat accumulator water temperature sensor 52) which detects a temperature of the cooling water in the heat accumulator 33 (a heat accumulator water temperature TWEST); in the motor travelling mode, the temperature raising control unit performs, before performing the second temperature raising control, a third temperature raising control for raising the temperature of the battery 31 by connecting the second battery circuit 42 to the heat accumulator circuit 34 with the third switching unit and introducing the cooling water in the heat accumulator 33 into the second battery circuit 42 when the heat accumulator cooling water temperature is higher than the battery temperature TBAT (steps 2, 8 and 9 in FIG. 3).

In this configuration, the battery temperature raising device includes: the heat accumulator circuit through which the cooling water flowing out from the internal combustion engine circulates; the heat accumulator which is arranged in the heat accumulator circuit and accumulates the heat of the cooling water; and the second battery circuit which is connected in parallel to the downstream of the heat accumulator of the heat accumulator circuit and through which the cooling water circulates; and these devices are configured as described above.

In addition, according to the battery temperature raising device, in the motor travelling mode, the third temperature raising control is performed when the detected heat accumulator cooling temperature is higher than the battery temperature before the second temperature raising control is performed. In the third temperature raising control, the temperature of the battery is raised by connecting the second battery circuit to the heat accumulator circuit and introducing the cooling water with a higher temperature in the heat accumulator into the second battery circuit. Thereby, the temperature raising of the battery can be effectively promoted by utilizing the heat of the cooling water in the heat accumulator before the second temperature raising control is performed.

In one embodiment of the disclosure, the battery temperature raising device for hybrid vehicle further includes an electric heater 37 which is arranged at an upstream side of a connection portion with the first battery circuit 41 in the engine cooling circuit and heats the cooling water in the engine cooling circuit; a second bypass flow path 18 which bypasses the internal combustion engine 2, is connected in parallel at an upstream side of the electric heater 37 in the engine cooling circuit, and forms, together with a part including the electric heater 37 of the engine cooling circuit and the first battery circuit 41, a closed circuit through which cooling water circulates; and a fourth switching unit (a second three-way valve 35) which switches connection/disconnection of the second bypass flow path 18 to the engine cooling circuit. In the motor travelling mode, the temperature raising control unit performs a fourth temperature raising control for raising the temperature of the battery 31 by making the electric heater 37 operate and respectively connecting the first battery circuit 41 and the second bypass flow path 18 to the engine cooling circuit with the first and the fourth switching units and introducing the cooling water heated by the electric heater 37 into the first battery circuit 41, when the heat accumulator cooling water temperature is below the battery temperature TBAT (steps 2, 10 and 12 in FIG. 3).

In this configuration, the battery temperature raising device further includes the electric heater arranged on the upstream side of the connection portion with the first battery circuit in the cooling water circuit, and the second bypass flow path that bypasses the internal combustion engine and forms, together with a part of the engine cooling circuit and the first battery circuit, a closed circuit through which cooling water circulates; and these devices are configured as described above.

In addition, according to the battery temperature raising device, in the motor travelling mode, the fourth temperature raising control is performed when the heat accumulator cooling water temperature is below the battery temperature. In the fourth temperature raising control, the temperature of the battery is raised by making the electric heater operate, and respectively connecting the first battery circuit and the second bypass flow path to the engine cooling circuit and introducing the cooling water heated by the electric heater into the first battery circuit. In addition, in the fourth temperature raising control, a closed circuit is formed by a part of the engine cooling circuit, the first battery circuit, and the second bypass flow path that bypasses the internal combustion engine. The cooling water circulates through the closed circuit and does not flow to the internal combustion engine. Thereby, the influence of the heat absorption of the cooling water in a low temperature state can be suppressed, and the temperature raising of the battery using the electric heater can be efficiently performed.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A battery temperature raising device for a hybrid vehicle, which raises a temperature of a battery in a low temperature state in the hybrid vehicle, the hybrid vehicle having an engine travelling mode using an internal combustion engine as a power source and a motor travelling mode using a motor generator that mutually converts an electric power of the battery and a mechanical power as the power source, the battery temperature raising device comprising:

an engine cooling circuit through which cooling water for cooling the internal combustion engine circulates;

a motor generator cooling circuit through which a refrigerant for cooling the motor generator circulates and which is independent of the engine cooling circuit;

a first battery circuit which is connected in parallel to the engine cooling circuit and in which cooling water circulates through the battery;

a first bypass flow path which bypasses the internal combustion engine, is connected in parallel to the engine cooling circuit, and forms, together with a part of the engine cooling circuit and the first battery circuit, a closed circuit through which cooling water circulates;

a heat exchanger which is arranged in the first bypass flow path and performs heat exchange between the cooling water of the engine cooling circuit and the refrigerant of the motor generator cooling circuit;

a first switching unit which switches connection/disconnection of the first battery circuit to the engine cooling circuit;

a second switching unit which switches connection/disconnection of the first bypass flow path to the engine cooling circuit;

a battery temperature sensor which detects the temperature of the battery;

an engine cooling water temperature sensor which detects a temperature of the cooling water of the internal combustion engine;

a motor generator temperature sensor which detects a temperature of the motor generator; and a temperature raising control unit, wherein in the engine travelling mode, the temperature raising control unit performs a first temperature raising control for raising the temperature of the battery by connecting the first battery circuit to the engine cooling circuit with the first switching unit and introducing the cooling water in the engine cooling circuit into the first battery circuit when the detected engine cooling water temperature is higher than a predetermined cooling water temperature; and in the motor travelling mode, the temperature raising control unit performs a second temperature raising control for raising the temperature of the battery by respectively connecting the first battery circuit and the first bypass flow path to the engine cooling circuit with the first and the second switching units and introducing the cooling water raised in temperature by heat exchange with the refrigerant in the heat exchanger into the first battery circuit when the detected motor generator temperature is higher than the detected battery temperature.

2. The battery temperature raising device for hybrid vehicle according to claim 1, further comprising:

a heat accumulator circuit which is connected in parallel to the engine cooling circuit and through which the cooling water flowing out from the internal combustion engine circulates;

a heat accumulator which is arranged in the heat accumulator circuit, stores the cooling water, and accumulates heat of the cooling water;

a second battery circuit which is connected in parallel at a downstream side of the heat accumulator in the heat accumulator circuit and in which the cooling water circulates through the battery;

a third switching unit which switches connection/disconnection of the second battery circuit to the heat accumulator circuit; and a heat accumulator cooling water temperature sensor which detects a temperature of the cooling water in the heat accumulator;

wherein in the motor travelling mode, the temperature raising control unit performs, before performing the second temperature raising control, a third temperature raising control for raising the temperature of the battery by connecting the second battery circuit to the heat accumulator circuit with the third switching unit and introducing the cooling water in the heat accumulator into the second battery circuit when the heat accumulator cooling water temperature is higher than the battery temperature.

3. The battery temperature raising device for hybrid vehicle according to claim 2, further comprising:

an electric heater which is arranged at an upstream side of a connection portion with the first battery circuit in the engine cooling circuit and heats the cooling water in the engine cooling circuit;

a second bypass flow path which bypasses the internal combustion engine, is connected in parallel at an upstream side of the electric heater in the engine cooling circuit, and forms, together with a part comprising the electric heater of the engine cooling circuit and the first battery circuit, a closed circuit through which cooling water circulates; and a fourth switching unit which switches connection/disconnection of the second bypass flow path to the engine cooling circuit;

wherein in the motor travelling mode, the temperature raising control unit performs a fourth temperature raising control for raising the temperature of the battery by making the electric heater operate, and respectively connecting the first battery circuit and the second bypass flow path to the engine cooling circuit with the first and the fourth switching units and introducing the cooling water heated by the electric heater into the first battery circuit when the heat accumulator cooling water temperature is below the battery temperature.

* * * * *